US011132006B2

(12) United States Patent
Matsuda et al.

(10) Patent No.: US 11,132,006 B2
(45) Date of Patent: Sep. 28, 2021

(54) POSITION CONTROLLER

(71) Applicant: KAWASAKI JUKOGYO KABUSHIKI KAISHA, Kobe (JP)

(72) Inventors: Kippei Matsuda, Kobe (JP); Shuma Kobayashi, Kobe (JP); Satoshi Ootsuki, Akashi (JP); Kenichi Nakashima, Kobe (JP); Hideyuki Imai, Akashi (JP); Akihito Abe, Kakogawa (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 20 days.

(21) Appl. No.: 16/617,608

(22) PCT Filed: May 16, 2018

(86) PCT No.: PCT/JP2018/018952
§ 371 (c)(1),
(2) Date: Nov. 27, 2019

(87) PCT Pub. No.: WO2018/221225
PCT Pub. Date: Dec. 6, 2018

(65) Prior Publication Data
US 2020/0183431 A1 Jun. 11, 2020

(30) Foreign Application Priority Data
May 31, 2017 (JP) .............................. JP2017-108176

(51) Int. Cl.
*F16H 61/02* (2006.01)
*G05D 3/12* (2006.01)
(Continued)

(52) U.S. Cl.
CPC ............... *G05D 3/12* (2013.01); *F16H 61/02* (2013.01); *B60K 2025/024* (2013.01);
(Continued)

(58) Field of Classification Search
CPC ........... Y10T 477/6243; Y10T 477/653; F16H 61/02; F16H 15/38; F16H 61/0265;
(Continued)

(56) References Cited

U.S. PATENT DOCUMENTS 3,008,337 A * 11/1961 Kraus ..................... F16H 15/38
476/10
4,998,449 A * 3/1991 Baba ................... F16H 61/0021
192/82 T (Continued)

FOREIGN PATENT DOCUMENTS

JP     2007-292001 A     11/2007
JP        4495117 B2      6/2010

*Primary Examiner* — Roger L Pang
(74) *Attorney, Agent, or Firm* — Sughrue Mion, PLLC

(57) ABSTRACT

A position controller that performs position control by outputting a drive signal to a control valve of a hydraulic actuator that changes an operation position of an object, includes: a position acquisition unit that acquires an actual value of an operation position of the object; a position control unit that calculates an operation command value for the control valve by closed-loop control so as to reduce a deviation between a target value of the operation position of the object and the actual value; and a vibration wave application unit that applies a vibration wave to a signal of the closed-loop control so that the operation command value vibrates at a predetermined frequency at start of the closed-loop control.

9 Claims, 7 Drawing Sheets

(51) Int. Cl.
  *B60W 10/109* (2012.01)
  *F16H 15/38* (2006.01)
  *F16H 59/72* (2006.01)
  *B60K 25/02* (2006.01)

(52) U.S. Cl.
  CPC ........... *B60W 10/109* (2013.01); *F16H 15/38* (2013.01); *F16H 59/72* (2013.01); *F16H 61/0265* (2013.01)

(58) Field of Classification Search
  CPC ................ F16H 2312/20; F16H 61/00; F16H 2061/0075; F16H 61/664; F16H 59/72; B60K 2025/024; B60W 10/109; G05D 3/12
  USPC ..................................................... 701/60, 61
  See application file for complete search history.

(56) References Cited

U.S. PATENT DOCUMENTS

| | | | |
|---|---|---|---|
| 10,712,755 B2* | 7/2020 | Ishii | F16K 29/00 |
| 2003/0000489 A1 | 1/2003 | Majima et al. | |
| 2011/0157758 A1* | 6/2011 | Benson | F16H 61/061 361/160 |
| 2019/0078683 A1* | 3/2019 | Nakashima | B60W 20/30 |
| 2020/0347929 A1* | 11/2020 | Matsuda | F16H 63/062 |

\* cited by examiner

[Fig. 1]
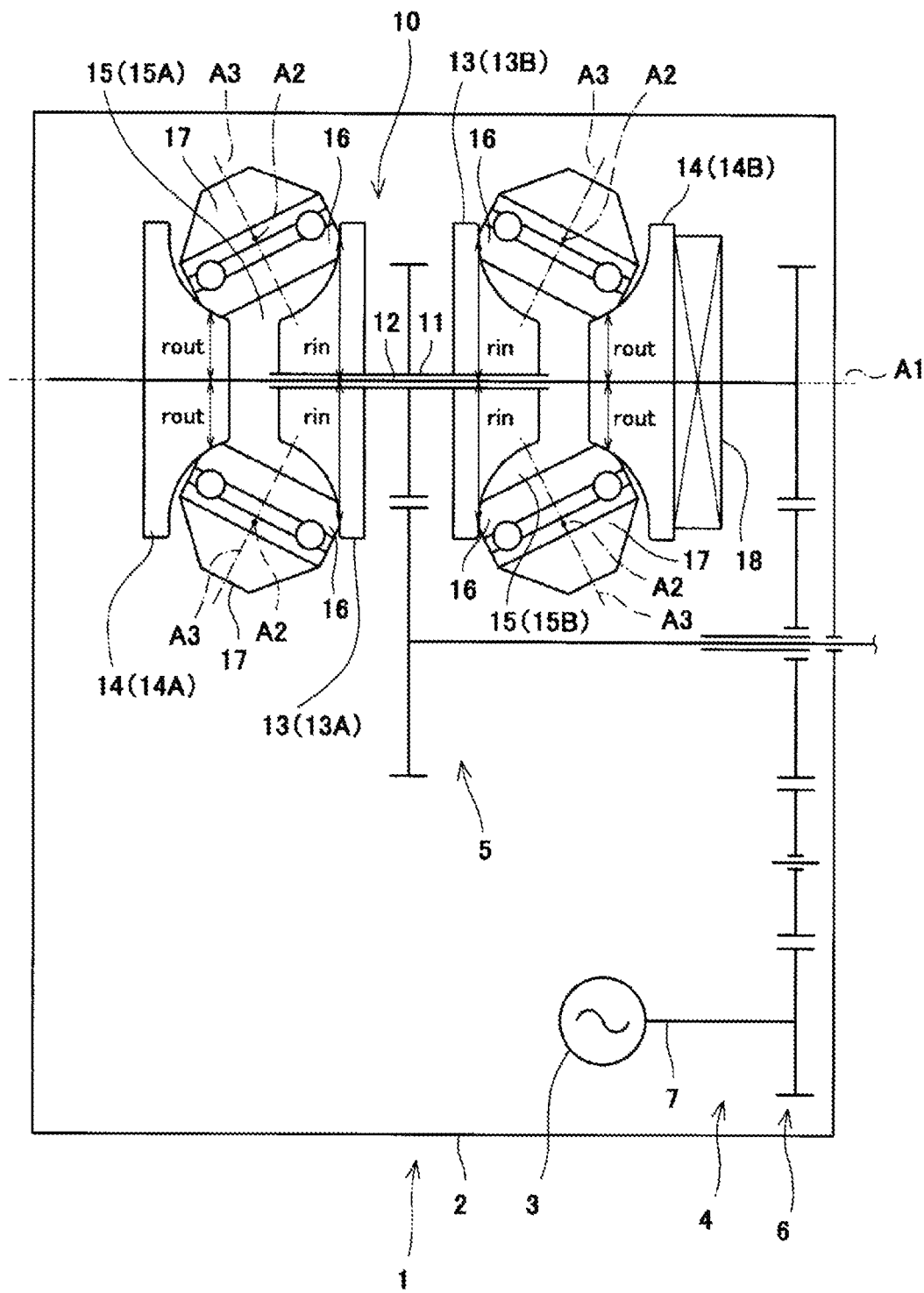

[Fig. 2]
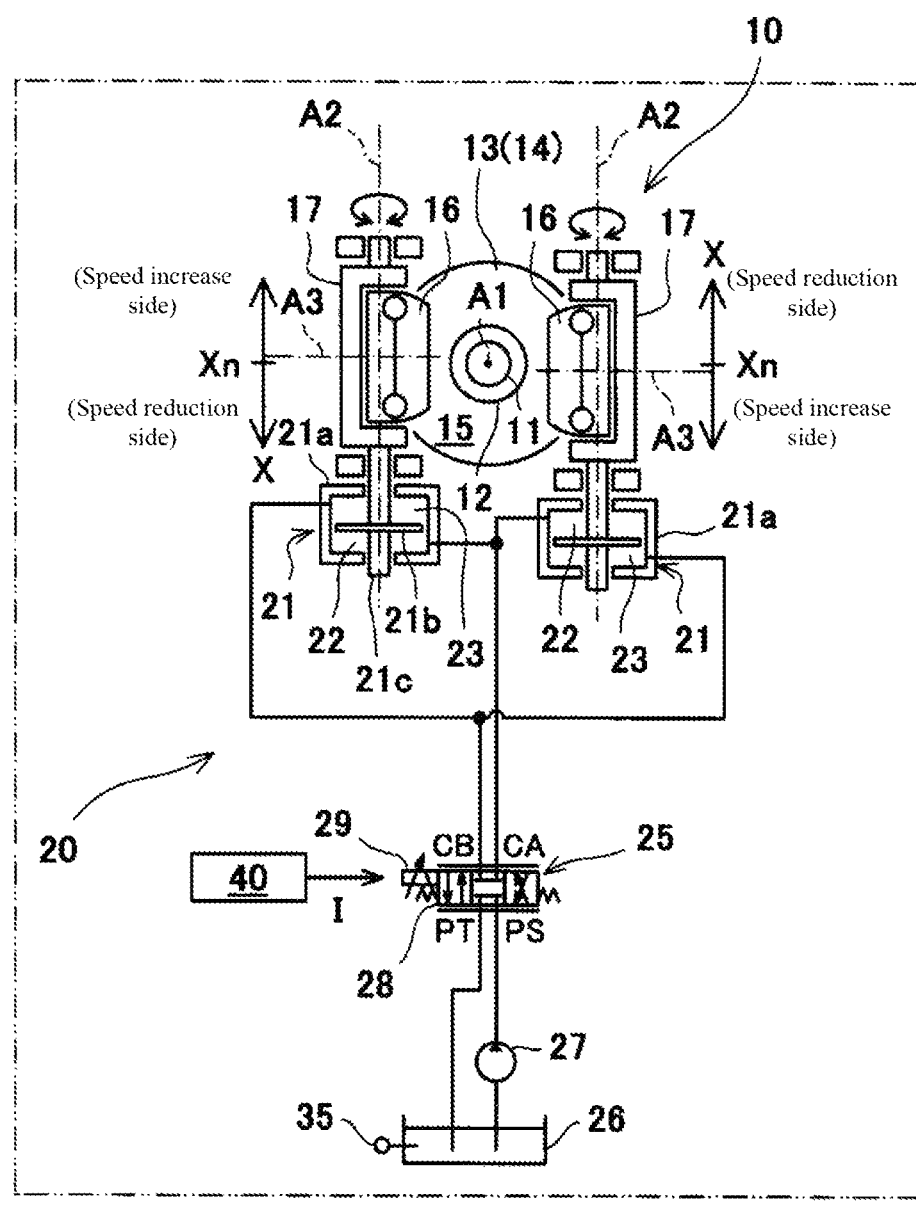

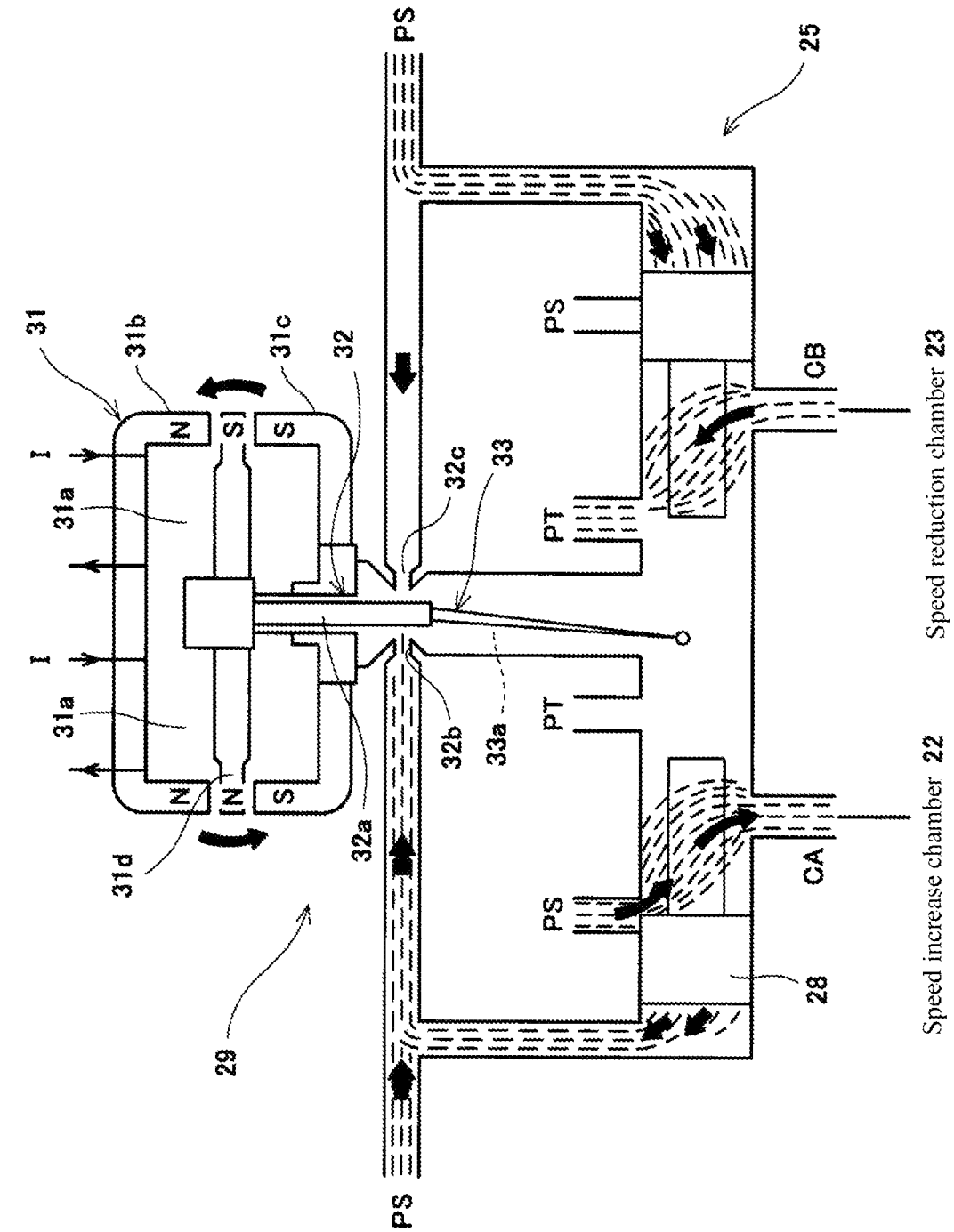
[Fig. 3]

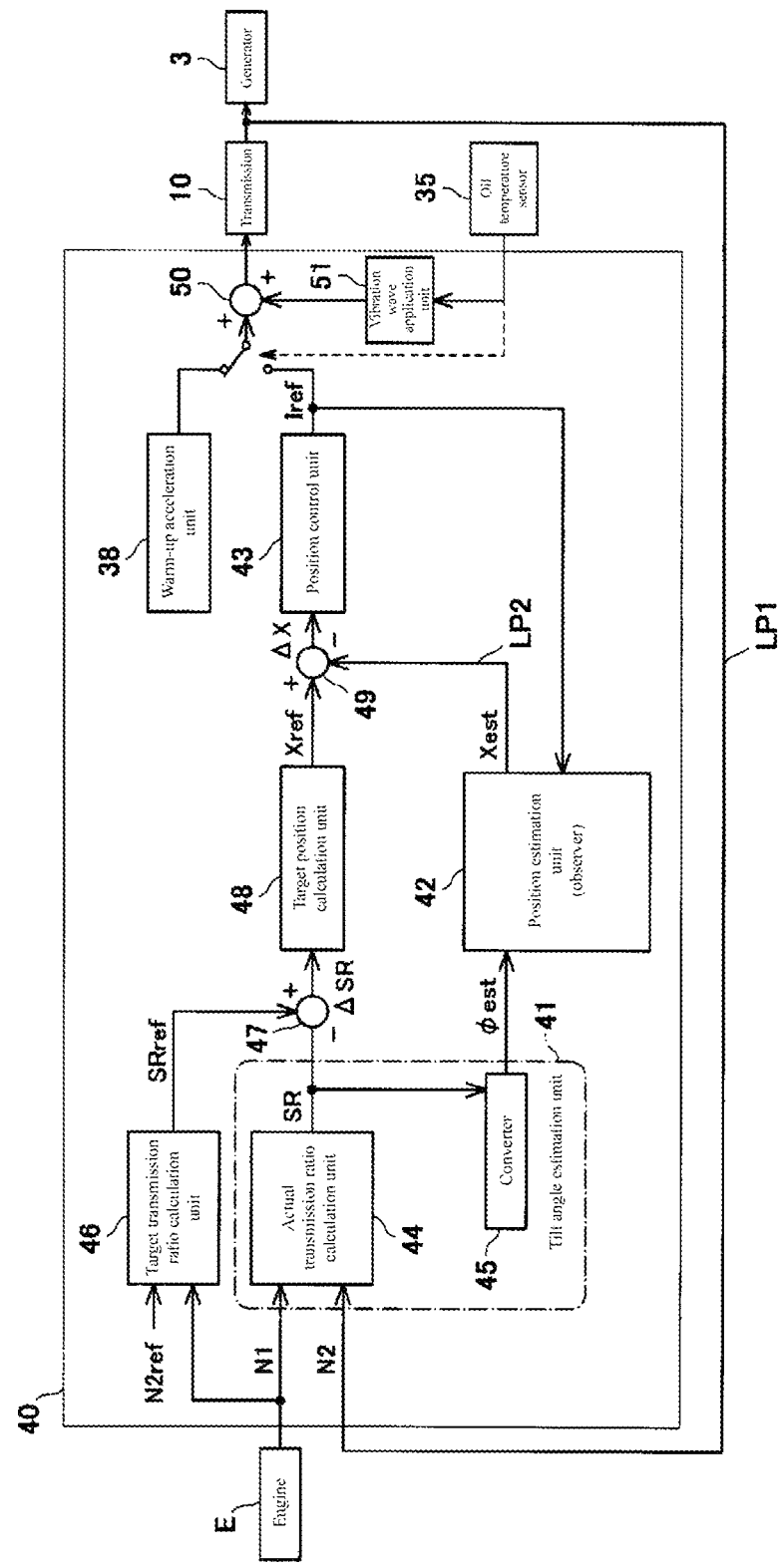
[Fig. 4]

[Fig. 5]
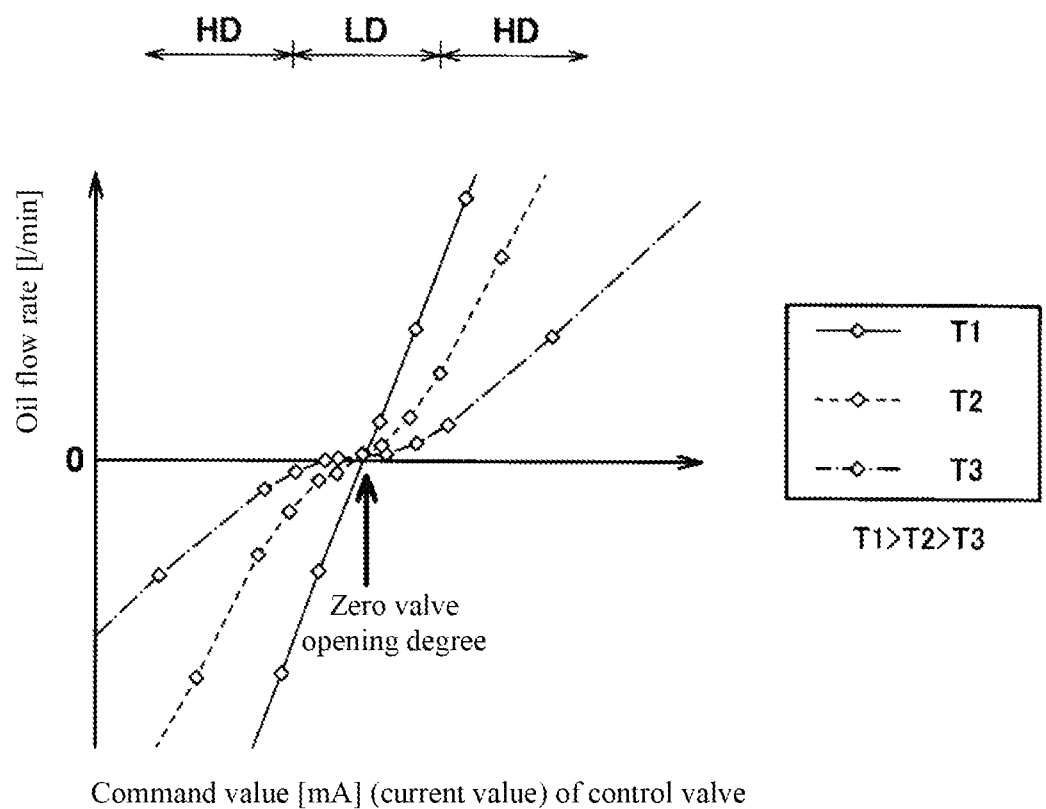

[Fig. 6]
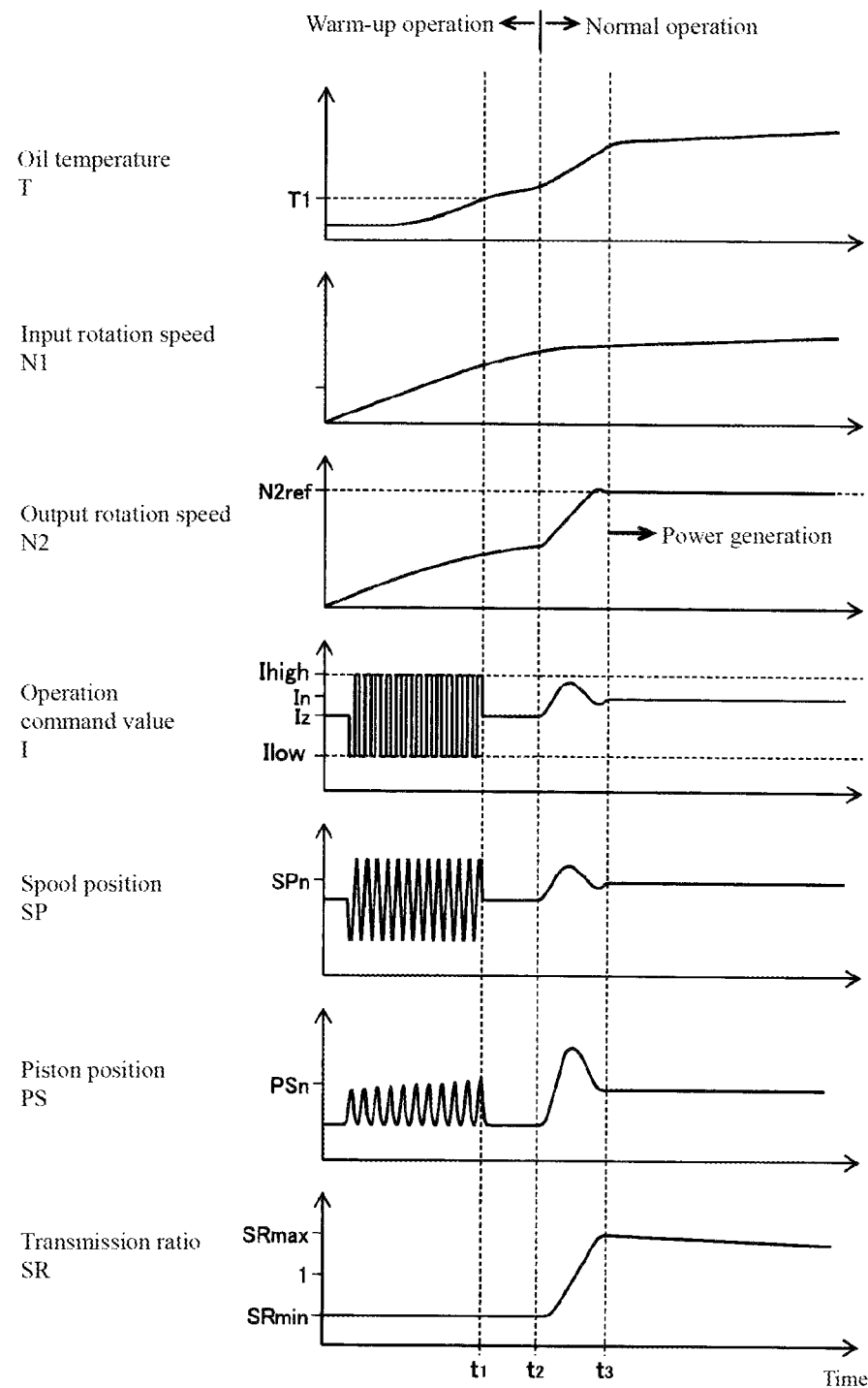

[Fig. 7]
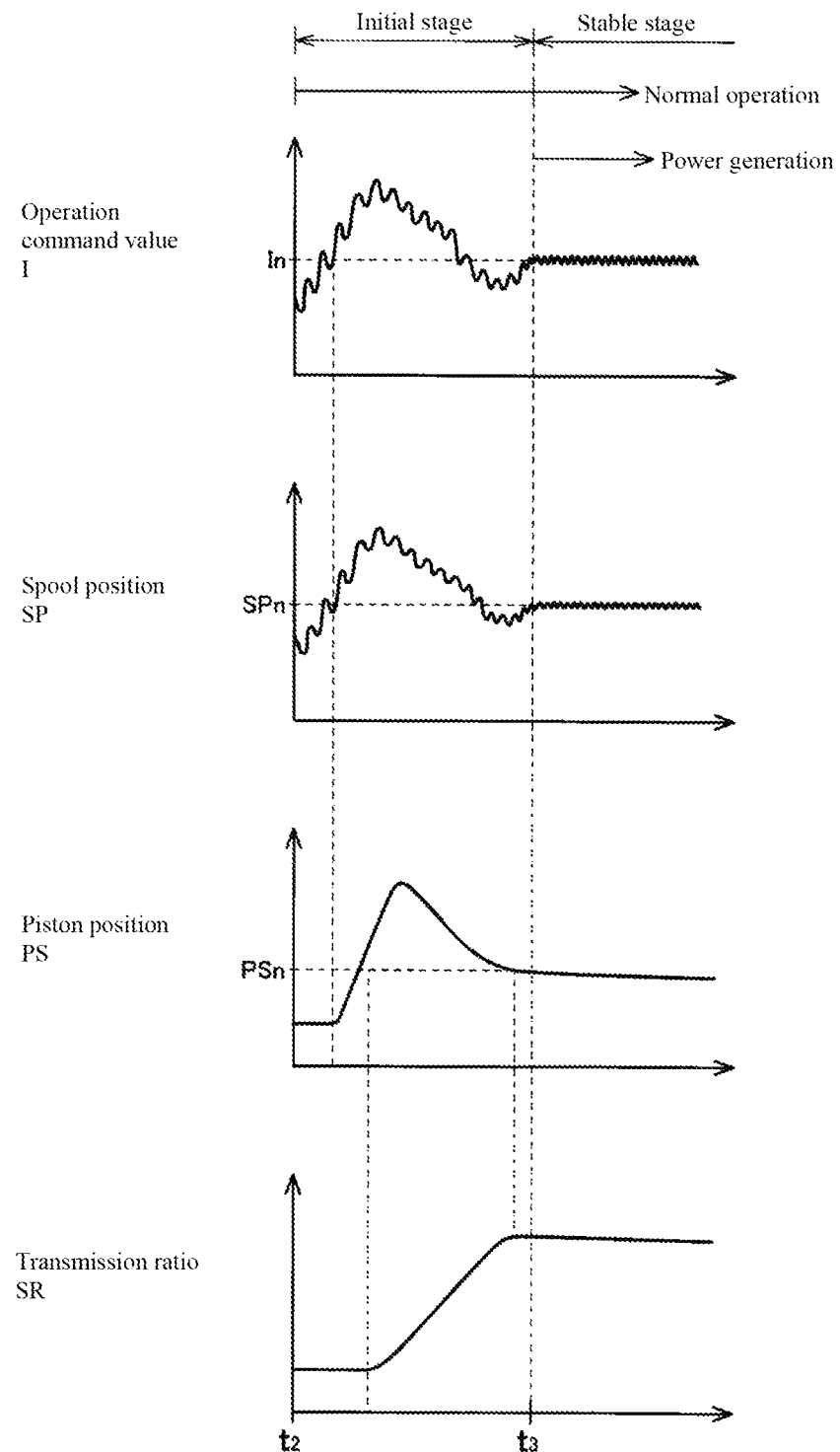

POSITION CONTROLLER

CROSS REFERENCE TO RELATED APPLICATIONS

This application is a National Stage of International Application No. PCT/JP2018/018952 filed May 16, 2018, claiming priority based on Japanese Patent Application No. 2017-108176, filed May 31, 2017.

TECHNICAL FIELD

The present invention relates to a position controller that performs position control by outputting a drive signal to a control valve of a hydraulic actuator.

BACKGROUND ART

In a toroidal continuously variable transmission, power rollers are displaced by a hydraulic mechanism in order to change the transmission ratio. However, at the time of startup in a cold region, response to the operation of the power roller is delayed due to a decrease in fluidity of the oil, and hence a warm-up operation is required at the time of low-temperature startup. As an example of the warm-up operation, in Patent Literature 1, in the warm-up operation at the time of low-temperature startup, a spool of a control valve of the hydraulic mechanism is reciprocated within a range in which the transmission is maintained in a speed-reduced state to vibrate the piston. In this manner, low-temperature control to promote warm-up by flowing oil is performed. When the oil temperature reaches the reference temperature, normal control for controlling the control valve so that the transmission ratio approaches the command value by closed-loop control is started.

CITATION LIST

Patent Literature

PTL 1: JP 4495117 B2

SUMMARY OF INVENTION

Technical Problem

In recent years, further shortening of the warm-up operation is desired for early startup of the transmission. However, if the reference temperature at which the warm-up operation is switched to the normal operation is lowered and normal control is started earlier, the fluidity of the oil is insufficient, and hence the viscosity resistance of the flow path becomes relatively large in the region where the opening degree of the control valve is small, so that strong nonlinearity appears in the relationship between the valve opening degree and the oil flow rate. Therefore, in the initial stage immediately after the start of the normal control, the closed-loop control may become unstable for a while, and there is a limit to shortening the warm-up operation.

Therefore, an object of the present invention is to prevent the instability of closed-loop control after switching from a warm-up operation to a normal operation while shortening the warm-up operation at the time of low-temperature startup.

Solution to Problem

According to one aspect of the present invention, there is provided a position controller that performs position control by outputting a drive signal to a control valve of a hydraulic actuator that changes an operation position of an object, the position control comprising: a position acquisition unit that acquires an actual value of an operation position of the object; a position control unit that calculates an operation command value for the control valve by closed-loop control so as to reduce a deviation between a target value of the operation position of the object and the actual value; and a vibration wave application unit that applies a vibration wave to a signal of the closed-loop control so that the operation command value vibrates at a predetermined frequency at start of the closed-loop control.

According to the above-described configuration, at the start of the closed-loop control, a vibration wave is added to the signal of the closed-loop control so that the operation command value for the control valve vibrates at a predetermined frequency. Thus, microscopically, the vibrational operation command value is applied to the control valve, and macroscopically, the operation command value obtained by averaging each value between the maximum value and the minimum value of the vibration is given to the control valve. Therefore, as compared to the case where a static operation command value is given to the control valve, the influence of the viscosity in the region where the opening degree of the control valve is small is relieved, and the nonlinearity between the valve opening degree and the oil flow rate is relieved. Therefore, it is possible to suppress the instability of the closed-loop control after switching from the warm-up operation to the normal operation while shortening the warm-up operation.

The frequency may be a frequency in a high frequency region in which a drive unit of the hydraulic actuator does not cause vibration due to the vibration wave.

According to the above-described configuration, it is possible to accurately control the position of the drive unit of the hydraulic actuator while stabilizing the closed-loop control.

There may be further provided an oil temperature acquisition unit that acquires information on an oil temperature of the hydraulic actuator. When it is determined that the oil temperature acquired by the oil temperature acquisition unit is lower than a reference temperature at the start of the closed-loop control, the vibration wave application unit may apply the vibration wave to the signal of the closed-loop control.

According to the above-described configuration, shortening of the warm-up operation and stabilization of the closed-loop control are effectively realizable in a low-temperature environment.

The vibration wave application unit may increase a frequency of the vibration wave as the oil temperature acquired by the oil temperature acquisition unit increases and/or decrease an amplitude of the vibration wave as the oil temperature increases.

According to the above-described configuration, when the oil temperature is low, sufficient linearization can be achieved by the vibrational operation of the control valve, and when the oil temperature rises, the vibrational operation of the control valve can be suppressed to further improve the control stability.

There may be further provided a warm-up acceleration unit that outputs a drive signal to the control valve so as to reciprocate a spool of the control valve during a warm-up operation before the start of the closed-loop control. A frequency of the vibration wave of the vibration wave application unit may be higher than a frequency of the drive signal of the warm-up acceleration unit.

According to the above-described configuration, stabilization of control and exact position control are realizable after the start of the closed-loop while promoting warming up.

The vibration wave application unit may apply the vibration wave to the signal of the closed-loop control in a predetermined first period after the closed-loop control is started and a second period after the first period elapses, and the vibration wave in the first period may have at least one of a lower frequency or a higher amplitude than the vibration wave in the second period.

According to the above-described configuration, sufficient linearization can be achieved by the vibrational operation of the control valve at the initial stage of the closed-loop control, and the vibrational operation of the control valve is suppressed when the oil temperature rises after a lapse of time from the start of the closed-loop control, so that the stability of the control can be further improved.

The object may be a transmission element that changes a transmission ratio of a continuously variable transmission in accordance with a position change thereof.

According to the above-described configuration, the closed-loop control of the transmission ratio using the hydraulic actuator can be started stably and quickly.

The continuously variable transmission may be a toroidal continuously variable transmission that changes the transmission ratio in accordance with a tilt angle of a power roller, and the transmission element may be the power roller.

According to the above-described configuration, the closed-loop control of the transmission ratio can be started stably and quickly at the time of low-temperature startup of the toroidal continuously variable transmission.

Power output from the continuously variable transmission may be input to a generator, and the generator may start a power generation operation with a delay from the start of the closed-loop control. The vibration wave application unit may apply the vibration wave to the signal of the closed-loop control at least in a period after the closed-loop control is started and before the power generation operation of the generator is started.

According to the above-described configuration, the power generation operation can be stably started early after the closed-loop control is started.

The vibration wave application unit may apply the vibration wave to the signal of the closed-loop control in an initial stage after the start of the closed-loop control and before start of the power generation operation of the generator and in a stable stage after the start of the power generation operation of the generator, and the vibration wave in the initial stage may have at least one of a lower frequency or a higher amplitude than the vibration wave in the stable stage.

According to the above-described configuration, sufficient linearization can be achieved by the vibrational operation of the control valve at the initial stage of the closed-loop control, and the vibrational operation of the control valve is suppressed in the stable stage after the start of the power generation operation, so that the stability of the control can be further improved.

Advantageous Effects of Invention

According to the present invention, it is possible to prevent the instability of the closed-loop control after switching from the warm-up operation to the normal operation while shortening the warm-up operation at the time of low-temperature startup.

BRIEF DESCRIPTION OF DRAWINGS

FIG. 1 is a skeleton diagram of an integrated drive generator according to an embodiment.

FIG. 2 is a hydraulic circuit diagram of the integrated drive generator shown in FIG. 1.

FIG. 3 is a cross-sectional view of a control valve shown in FIG. 2.

FIG. 4 is a block diagram of a transmission controller of the integrated drive generator shown in FIG. 1.

FIG. 5 is a graph showing a test result of the relationship between a command value (drive current) of a control valve and an oil flow rate.

FIG. 6 is a timing chart showing an example of the oil temperature at the time of startup by a transmission controller shown in FIG. 4 and other temporal changes.

FIG. 7 is an enlarged view of FIG. 6.

DESCRIPTION OF EMBODIMENTS

Hereinafter, embodiments will be described with reference to the drawings.

FIG. 1 is a skeleton diagram of a drive mechanism-integrated power generator 1 according to the embodiment. As shown in FIG. 1, the integrated drive generator (hereinafter referral to as "IDG") 1 is used as an AC power supply for an aircraft. At the time of startup of the IDG1, even if rotational power of an engine rotary shaft of an aircraft starts to be transmitted to the IDG1, until the IDG1 can be stably operated, electrical components in the aircraft are driven by an auxiliary power supply that is different from the IDG1 (for example, an external generator or an auxiliary generator). When the IDG1 can be stably operated, the power supply of the electrical components is switched from the auxiliary power supply to the IDG1. Since the IDG1 is used as a main power supply of the aircraft, the power supply is switched from the auxiliary power supply to the IDG1 before takeoff.

The IDG 1 includes a casing 2 attached to an engine of an aircraft, and a generator 3 is accommodated in the casing 2 together with a constant speed drive (hereinafter, referred to as "CSD") 4. The CSD4 forms a power transmission path that transmits the rotational power of the engine rotary shaft (not shown) of the aircraft to the generator 3, and a toroidal continuously variable transmission 10 (hereinafter referred to as "toroidal CVT") forms a part thereof. The rotational power of the engine rotary shaft is input to the toroidal CVT10 via an input path 5 of the CSD 4, is changed in gear by the toroidal CVT10, and is output to a generator shaft 7 via an output path 6 of the CSD4. When the generator shaft 7 rotates, the generator 3 generates AC power at a frequency which is proportional to the rotation speed of the generator shaft 7. The transmission ratio SR of the toroidal CVT10 is continuously changed so as to keep the rotation speed of the generator shaft 7 at an appropriate value (value corresponding to the frequency at which the electrical components in the aircraft are stably operated) regardless of fluctuations in the rotation speed of the engine rotary shaft. In this way, the frequency of the AC power generated by the generator 3 is maintained at an appropriate value, and the electrical components in the aircraft are stably operated.

In the toroidal CVT10, a CVT input shaft 11 and a CVT output shaft 12 are coaxially arranged on the CVT axis line A1. Input discs 13 are provided on the CVT input shaft 11 so as to be integrally rotatable, and output discs 14 are provided on the CVT output shaft 12 so as to be integrally rotatable. The input disc 13 and the output disc 14 face each other and form an annular cavity 15. In the present embodiment, the toroidal CVT10 is a double cavity type, and includes two sets of input discs 13A and 13B and output discs 14A and 14B having the same structure, and two cavities 15A and 15B are arranged in the direction of the CVT axis line A1. Two power rollers 16 (objects) are arranged in one cavity 15, and each power roller 16 is supported by a trunnion 17 so as to be rotatable around the rolling axis line A3. The trunnions 17 correspond to the power rollers 16, respectively, in a one-to-one correspondence. The trunnions 17 are supported by the casing 2 so that each of the trunnions 17 is displaceable in the extension direction of the tilt axis line A2 and is rotatable around the tilt axis line A2.

The power rollers 16 are supplied with traction oil, and pushed against the discs 13 and 14 by a clamping force generated by a clamping mechanism 18. The clamping mechanism 18 may be a cam type (sometimes referred to as a loading cam mechanism) or a hydraulic mechanism. As a result, a high-viscosity oil film is formed on the input side contact portion (contact interface between the power roller 16 and the input disc 13) and the output side contact portion (contact interface between the power roller 16 and the output disc 14). The CVT input shaft 11 is driven to rotate by the rotational power input from the input path 5. With the rotation of the CVT input shaft 11, the input discs 13 rotate together with the CVT input shaft 11 and the power rollers 16 are driven to rotate around the rolling axis line A3 by a shear resistance of the oil film which is generated in the input side contact portion. With the rotation of the power rollers 16 around the rolling axis line A3, the output discs 14 are driven to rotate by a shearing resistance of the oil film which is generated on the output side contact portion, and the CVT output shaft 12 rotates integrally therewith. The rotational power of the CVT output shaft 12 is output to the output path 6.

The transmission ratio SR is continuously changed in accordance with the roller positions X (positions in the extending directions of the tilt axis lines A2 of the power rollers 16). The transmission ratio SR is defined as the ratio of the output rotation speed (rotation speed of the CVT output shaft 12) N2 to the input rotation speed (rotation speed of the CVT input shaft 11) N1 of the toroidal CVT10, and is equal to the radius ratio ($SR=N2/N1=r_{in}/r_{out}$). The radius ratio is a ratio of the input side contact radius $r_{in}$ (distance from the CVT axis line A1 to the input side contact portion) to the output side contact radius $r_{out}$ (distance from the CVT axis line A1 to the output side contact portion). With the change in the roller positions X, the power rollers 16 rotate around the tilt axis lines A2 until a side slip is ceased, and tilt angles φ (rotation angles of the power rollers 16 around the tilt axis lines A2) are changed. With the change in the tilt angles φ, the input side contact portions and the output side contact portions are displaced, and hence the input side contact region radiuses $r_{in}$ and the output side contact region radiuses $r_{out}$ are continuously changed. Therefore, the radius ratio, that is, the transmission ratio SR is continuously changed.

FIG. 2 is a hydraulic circuit diagram of the integrated drive generator 1 shown in FIG. 1. As shown in FIG. 2, the roller positions X are changed by a hydraulic actuator 20. The hydraulic actuator 20 includes a plurality of hydraulic cylinders 21 (drive units). The hydraulic cylinders 21 correspond to the power rollers 16 and the trunnions 17, respectively, in a one-to-one correspondence. The hydraulic cylinders 21 each include a body 21a, a piston 21b, and a rod 21c. The hydraulic cylinder 21 is a double-acting type, and the inside of the body 21a is partitioned into a speed increase chamber 22 and a speed reduction chamber 23 by the piston 21b. The rod 21c is arranged coaxially with the tilt axis line A2, connects the piston 21b to the trunnion 17, and moves in the extending direction of the tilt axis line A2 together with the trunnion 17 and the power roller 16 supported by the trunnion 17.

When oil is supplied to the speed increase chambers 22 and discharged from the speed reduction chambers 23, the roller positions X are changed to the speed increase side in the extending direction of the tilt axis lines A2. When the oil flows in the opposite direction, the roller positions X are changed to the speed reduction side that is the opposite side to the speed increase side in the extending direction of the tilt axis lines A2. The two power rollers 16 arranged in one cavity 15 are displaced in opposite directions in the extending direction of the tilt axis lines A2 in order to keep the radius ratio equal to each other when the roller positions X are changed.

When the roller positions X are changed to the speed increase side, the tilt angles φ increase and the transmission ratio SR increases. When the roller positions X are changed to the speed reduction side, the tilt angles φ decrease and the transmission ratio SR decreases. When the roller positions X reaches the upper limit points $X_{max}$, the tilt angles φ become the maximum tilt angles $φX_{max}$, and the transmission ratio SR exceeds the maximum transmission ratio $SRX_{max}$ which exceeds 1. When the roller positions X reach the lower limit points $X_{min}$, the tilt angles φ become the minimum tilt angles $φ_{min}$, and the transmission ratio SR becomes the minimum transmission ratio $SR_{min}$ which is less than 1. The allowable tilt range of the power roller 16 is mechanically determined by a stopper (not shown) provided on the trunnion 17 to prevent excessive tilting. If the roller positions X are the neutral points $X_n$, the tilt angles φ become the neutral angles φn, and the transmission ratio SR becomes 1. The neutral angle φn is approximately equal to the median value of the allowable tilt range, and the minimum transmission ratio $SR_{min}$ is approximately equal to the reciprocal of the maximum transmission ratio $SRX_{max}$.

The hydraulic actuator 20 further includes a control valve 25. The hydraulic cylinders 21 correspond to the power rollers 16, respectively, in a one-to-one correspondence, whereas the control valve 25 is single for the plurality of power rollers 16, for example. The control valve 25 is a four-way switching valve, and has a supply port PS, a return port PT, a speed-increase control port CA, and a speed-reduction control port CB. A hydraulic pump 27 that sucks oil from the oil tank 26 is connected to the supply port PS, and the return port PT is connected to the oil tank 26. The speed-increase control port CA is connected to the speed increase chambers 22, and the speed reduction chambers 23 are connected to the speed-reduction control port CB. The control valve 25 is a spool valve, and the connection states of the ports are switched in accordance with the position of a spool 28. The control valve 25 is a three-position switching valve, and the spool 28 is positioned in the shut-off region (center position in FIG. 2), the speed increase region (left position in FIG. 2), or the speed reduction region (right position in FIG. 2).

In the shut-off region, the control ports CA, CB are cut-off from the supply port PS and the return port VT. At this time, the supply/discharge of oil to/from the speed increase chamber 22 and the speed reduction chamber 23 is stopped, and the transmission ratio is maintained. In the speed increase region, the speed-increase control port CA is connected to the supply port PS and the speed-reduction control port CB is connected to the return port PT. At this time, oil is supplied to the speed increase chamber 22 and discharged from the speed reduction chamber 23, and the transmission ratio increases. In the speed reduction region, the speed-increase control port CA is connected to the return port PT and the speed-reduction control port CB is connected to the supply port PS. At this time, oil is supplied to the speed reduction chamber 23 and discharged from the speed increase chamber 22, and the transmission ratio decreases. When the spool 28 is positioned in the speed increase region or the speed reduction region, the opening degrees of the supply port PS and the return port PT are variably set in accordance with the spool position in the region.

The control valve 25 includes a drive unit 29 that drives the spool 28 to control the spool position and opening degrees. The flow rate and pressure of oil supplied/discharged to/from the speed increase chamber 22 and the speed reduction chamber 23 are adjusted by the drive unit 29. The control valve 25 is an electric valve, and the drive unit 29 receives a drive signal from a transmission controller 40 (position controller) and controls the spool position and opening degrees in accordance with the output value I (current value) of the drive signal.

An IDG2 is provided with an oil temperature sensor 35 (oil temperature acquisition unit) that detects the temperature of the hydraulic oil in the hydraulic actuator 20. The oil temperature sensor 35 may be arranged anywhere as long as it can detect the temperature of the oil flowing through the hydraulic circuit of the hydraulic actuator 20, but as an example, the oil temperature sensor 35 is arranged at a position for detecting the temperature of the oil stored in the oil tank 26.

FIG. 3 is a cross-sectional view of the control valve 25 shown in FIG. 2. As shown in FIG. 3, the control valve 25 is a nozzle flapper type servo valve. The drive unit 29 includes a motor unit 31 that generates torque when a drive signal is input, a nozzle flapper unit 32 that displaces the spool 28 in accordance with the torque generated by the motor unit 31, and a feedback unit 33 that operates the motor unit 31 and the nozzle flapper unit 32 in accordance with the displacement of the spool 28.

In the motor unit 31, when a drive signal is input to a coil 31a, a torque corresponding to the polarity and magnitude of the drive signal is generated in an armature 31d based on the magnetic force acting between upper and lower magnetic poles 31b and 31c and the armature 31d. As a result, the armature 31d is inclined with respect to the upper and lower magnetic poles 31b and 31c. In the nozzle flapper unit 32, a flapper 32a integrated with the armature 31d is displaced in conjunction with the inclination of the armature 31d. As a result, the amount of orifice restriction between the flapper 32a and a left nozzle 32b and the amount of orifice restriction between the flapper 32a and a right nozzle 32c change, and the balance of the nozzle back pressures is broken (the nozzle back pressure on the side that the flapper 32a approaches increases and the nozzle back pressure on the side from which the flapper 32a separates away decreases). Both end surfaces of the spool 28 receive the left nozzle back pressure and the right nozzle back pressure, respectively, and the spool 28 starts to be displaced as the nozzle back pressures are imbalanced. The feedback unit 33 is configured by, for example, a spring 33a supported by the spool 28 and the armature 31d. When the spool 28 is displaced, a torque opposite to the torque based on the magnetic force is generated in the spring 33a, and the flapper 32a and the armature 31d are returned to the neutral position by the torque. Thereby, the balance of the nozzle back pressures is obtained and the spool 28 is stopped. Based on the above-described principle, the spool position and the opening degrees corresponding to the polarity and magnitude of the drive signal can be obtained.

The hydraulic actuator 20 includes a bias mechanism (not shown) that forcibly holds the roller positions X at predetermined positions when the drive signal satisfies a predetermined condition. For example, the bias mechanism forcibly returns the roller positions X to the lower limit points $X_{min}$ when the condition that the output value I is the zero value $I_z$ is satisfied, and maintains the transmission ratio SR at the minimum transmission ratio $SR_{min}$ on the safe side. Even when the condition that the output value I is a negative value is satisfied, the roller positions X are forcibly returned to the lower limit points $X_{min}$. The bias mechanism is realized by mechanically giving the armature 31d a constant initial inclination with respect to its neutral position. If the output value I is the zero value $I_z$, a differential pressure corresponding to the initial inclination occurs between the right and left nozzle back pressures. As a result, the spool 28 is positioned not at the neutral position $SP_n$ in the shut-off region but at the bias position in the speed reduction region.

If the output value I becomes the zero value $I_z$ and the spool 28 is maintained at the bias position, the roller positions X, the tilt angles $\varphi$, and the transmission ratio SR reach the lower limit points $X_{min}$, the minimum tilt angles $\varphi_{min}$, and the minimum transmission ratio $SR_{min}$, respectively, and are maintained thereat. Conversely, in order to maintain the roller positions X by positioning the spool 28 at the neutral position $SP_n$ in the shut-off region, it is necessary to set the output value I of the drive signal so that torque required for canceling the initial tilt is generated in the armature 31d to continue energizing the coil 31a with the drive signal. Hereinafter, the output value I for obtaining the neutral position $SP_n$ is referred to as "neutral value $I_n$".

FIG. 4 is a block diagram of the transmission controller 40 of the integrated drive generator 1 shown in FIG. 1. As shown in FIG. 4, the transmission controller 40 includes a tilt angle estimation unit 41 that obtains the estimated value $\varphi_{est}$ which is a value obtained by estimating the actual value of the tilt angle, a position estimation unit 42 (position acquisition unit) that obtains estimated values $X_{est}$ which are values obtained by estimating actual values of the roller positions, and a position control unit 43 that obtains the operation command value $I_{ref}$ of the hydraulic actuator 20 so as to eliminate the deviation $\Delta X$ between target values $X_{ref}$ and the estimated values $X_{est}$ of the roller positions. The tilt angle estimation unit 41 obtains the estimated value $\varphi_{est}$ of the tilt angle by calculation without using a sensor that directly detects the tilt angle. The operation command value $I_{ref}$ is, for example, an output value (current value) of a drive signal given to the control valve 25 of the hydraulic actuator 20.

The tilt angle estimation unit 41 includes an actual transmission ratio calculation unit 44 (actual transmission ratio acquisition unit) that obtains the actual transmission ratio SR, and a converter 45 that converts the actual transmission ratio SR into the estimated value $\varphi_{est}$ of the tilt angle. The actual transmission ratio calculation unit 44 obtains the actual transmission ratio SR in accordance with the ratio between the input rotation speed N1 of the toroidal CVT10 (rotation speed of the engine E) and the output rotation speed N2 of the toroidal CVT10. The input rotation speed N1 and the output rotation speed N2 are detected by an input rotation speed sensor and an output rotation speed sensor, respectively.

The converter 45 obtains the estimated value $\varphi_{est}$ that is a value obtained by estimating the tilt angle in accordance with the actual transmission ratio SR based on the inverse function ($\varphi=f^{-1}$ (SR)) of the function of the tilt angle $\varphi$ with respect to the actual transmission ratio SR. The converter 45 may actually perform the arithmetic operation of the inverse function. Further, in order to reduce the calculation load, a table in accordance with the inverse function may be created in advance and stored in the transmission controller 40, and the estimated value $\varphi_{est}$ may be obtained by table processing.

The position estimation unit 42 is an observer created using the models of the tilt angles $\varphi$ and the model of the hydraulic actuator 20, and obtains the estimated values $X_{est}$ of the roller positions based on the estimated value $\varphi_{est}$ of the tilt angle, and the operation command value $I_{ref}$ of the hydraulic actuator 20.

The transmission controller 40 includes a target transmission ratio calculation unit 46 that obtains the command value $SR_{ref}$ of the transmission ratio. The target transmission ratio calculation unit 46 calculates the command value $SR_{ref}$ of the transmission ratio in accordance with the ratio between the input rotation speed N1 detected by the input rotation speed sensor and the command value $N2_{ref}$ of the output rotation speed stored in advance. In the present embodiment, the command value $N2_{ref}$ of the output rotation speed is set to a constant value corresponding to a frequency suitable for the operation of electrical components in the aircraft. For example, when the target frequency fref is 400 Hz, the number of poles of the generator 3 is 2, and the detection target of the output rotation speed sensor is the rotation speed of the generator shaft 7, the command value $N2_{ref}$ is a constant value of 24,000 rpm.

The transmission controller 40 includes a transmission ratio subtraction unit 47 that obtains the deviation $\Delta SR$ between the command value $SR_{ref}$ of the transmission ratio and the actual transmission ratio SR ($\Delta SR=SR_{ref}-SR$). The transmission controller 40 includes a target position calculation unit 48 that calculates the target values $X_{ref}$ of the roller positions so as to reduce the deviation $\Delta SR$ of the transmission ratio. That is, the target position calculation unit 48 calculates the target values $X_{ref}$ of the roller positions with the predetermined calculation gain $G_1$ so that the deviation $\Delta SR$ approaches zero by major closed-loop control LP1 (first closed-loop control; feedback control). In the present embodiment, the calculation gain $G_1$ is constant.

The transmission controller 40 includes a position subtraction unit 49 that obtains the deviation $\Delta X$ between the target values $X_{ref}$ and the estimated values $X_{est}$ of the roller positions ($\Delta X=X_{ref}-X_{est}$). The position control unit 43 calculates the operation command value $I_{ref}$ of the hydraulic actuator 20 so as to reduce the deviation $\Delta X$. That is, the position control unit 43 calculates the operation command value $I_{ref}$ with the predetermined calculation gain $G_2$ so that the deviation $\Delta X$ approaches zero by minor closed-loop control LP2 (second closed-loop control; feedback control). The calculation gain $G_2$ will be described later.

The minor closed-loop control LP2 returning to the position subtraction unit 49 is a loop included in the major closed-loop control LP1 returning to the transmission ratio subtraction unit 47. When the control valve 25 of the hydraulic actuator 20 is given a drive signal indicated by the operation command value $I_{ref}$, the actual roller positions are brought closer to the target values $X_{ref}$. Then, the actual transmission ratio SR is brought closer to the command value $SR_{ref}$, and the output rotation speed N2 is brought closer to the command value $N2_{ref}$. For control stability, it is desired that the sensitivity of the minor closed-loop control LP2 (roller position control) is higher than the sensitivity of the major closed-loop control LP1 (transmission ratio control). That is, it is desired that the ratio ($\Delta I_{ref}/\Delta X_{ref}$) of the change rate of the output (operation command value $I_{ref}$) to the change rate of the input (target value $X_{ref}$) of the minor closed-loop control LP2 is higher than the ratio ($\Delta X_{ref}/\Delta SR_{ref}$) of the change rate of the output (target value $X_{ref}$) to the change rate of the input (command value $SR_{ref}$) of the major closed-loop control LP1.

The position control unit 43 performs gain adjustment to increase the calculation gain $G_2$ of the operation command value $I_{ref}$ at a predetermined change rate as the oil temperature detected by the oil temperature sensor 35 becomes lower. Specifically, the position control unit 43 calculates the operation command value $I_{ref}$ based on the calculation gain $G_2$ determined by a gain setting unit 60 in accordance with the oil temperature T detected by the oil temperature sensor 35.

As described above, the transmission controller 40 implements a feedback control function for normal control by the tilt angle estimation unit 41, the position estimation unit 42, the position control unit 43, the target transmission ratio calculation unit 46, the transmission ratio subtraction unit 47, the target position calculation unit 48, and the position subtraction unit 49, and the transmission controller 40 further includes a warm-up acceleration unit 38 that implements a feed-forward control function for low-temperature control at the time of startup. The control by the warm-up acceleration unit 38 and the control by the position control unit 43 are switched to each other in accordance with the oil temperature detected by the oil temperature sensor 35.

The transmission controller 40 includes a command value addition unit 50 that adds the vibration wave applied from a vibration wave application unit 51 to the operation command value $I_{ref}$ calculated by the position control unit 43. The vibration wave application unit 51 is arranged inside the unit provided with the position control unit 43, the target position calculation unit 48, and the like, but may be arranged outside the unit as long as a vibration wave can be applied to the operation command value (current value) input to the control valve 25 of the toroidal CVT10.

FIG. 5 is a graph showing a test result of the relationship between the command value (drive current) of the control valve 25 and the oil flow rate. FIG. 5 shows the relationship between the command value of the control valve 25 and the oil flow rate at different oil temperatures T1 to T3 (T1>T2>T3), and it is found that the oil flow rate decreases as the oil temperature decreases. That is, as the oil temperature decreases, the oil viscosity increases and the oil flow rate in the control valve 25 decreases. In FIG. 5, the oil flow rate decreases as the drive current of the control valve 25 approaches the value corresponding to zero valve opening degree, and the change rate of the oil flow rate accompanying the change in the valve opening degree has different nonlinearities between the low opening-degree region LD and the high opening-degree region HD. That is, the absolute value of the decrease rate of the oil flow rate accompanying the decrease in the valve opening degree is smaller in the low opening-degree region LD than in the high opening-degree region HD. In the present embodiment, when the opening degree $\alpha$ of the control valve 25 is to be fully open at 100% and fully closed at 0%, the low opening-degree region LD is, for example, a region including at least 0%<α<20%, and the high opening-degree region HD is, for example, a region including at least 80%<α<100%. The vibration wave application unit 51 is provided in order to correct the nonlinearization of the change rate of the oil flow rate accompanying the change in the oil temperature/valve opening degree.

FIG. 6 is a timing chart showing an example of the oil temperature T at the time of startup by the transmission controller 40 shown in FIG. 4 and other temporal changes. As shown in FIGS. 4 and 6, when the oil temperature T detected by the oil temperature sensor 35 is lower than the reference temperature T1 at the time of startup of the IDG 1, a warm-up operation in which the control valve 25 is subjected to open-loop control by the warm-up acceleration unit 38 is executed. The reference temperature T1 is, for example, a value within a range of −20 to −10° C. When the oil temperature T becomes equal to or higher than the reference temperature T1, and the warm-up operation is completed, the normal operation in which the control valve 25 is subjected to close-loop control by the position control unit 43 is executed.

In the warm-up operation, the warm-up acceleration unit 38 outputs the operation command value I so as to reciprocate the spool 28. The waveform of the operation command value I is set, for example, such that the maximum value $I_{high}$ is a value larger than the neutral value $I_n$ and the minimum value $I_{low}$ is a value smaller than the neutral value $I_n$. As a result, oil flows alternately between the speed increase side and the speed reduction side in the control valve 25, and the piston 21b of the hydraulic cylinder 21 also vibrates slightly. Thus, the increase in the oil temperature T is promoted by forcibly causing the oil to flow by reciprocating the spool 28 and the piston 21b. Further, in the waveform of the operation command value I, the difference from the neutral value $I_n$ of the maximum value $I_{high}$ is smaller than the difference from the neutral value $I_n$ of the minimum value $I_{low}$. The piston 21b cannot respond sensitively to the operation command value I. Therefore, the piston 21b reciprocates on the speed reduction side with respect to the neutral position $PS_n$, and an excessive increase in the output rotation speed N2 is prevented.

When the oil temperature T reaches the reference temperature T1 (t1), the reciprocation of the spool 28 and the piston 21b is stopped, and the drive signal is output so that the roller positions X are maintained at predetermined positions (maximum speed-reduction positions) for a predetermined standby time by the action of the bias mechanism described above. Until the standby time elapses, the operation command value I is fixed at the bias mechanism operating value (zero value $I_z$). When the standby time elapses (t2), the warm-up operation is terminated and the normal operation is started.

In the normal operation, the position control unit 43 obtains the operation command value $I_{ref}$ by closed-loop control. That is, when the position control unit 43 outputs the operation command value $I_{ref}$ corresponding to the deviation ΔX, the roller position X is brought closer to the command value $X_{ref}$, and the transmission ratio SR is brought closer to the command value $SR_{ref}$. However, when the warm-up operation is shortened by setting the reference temperature T1 low, the control immediately after the start of the normal control may become unstable. Therefore, in the present embodiment, in the initial stage of the closed-loop control which is a period after the start of the closed-loop control in the normal operation and before the start of power generation by the generator 3, a vibration wave is applied to the operation command value $I_{ref}$ calculated by the position control unit 43 by the vibration wave application unit 51 (the vibration wave is minute and is not shown in FIG. 6).

FIG. 7 is an enlarged view of FIG. 6. As shown in FIG. 7, when the closed-loop control in the normal operation is started (t2), a vibration wave is applied to the operation command value $I_{ref}$ by the vibration wave application unit 51. The vibration wave is a waveform having a positive maximum value and a negative minimum value. The vibration wave generated by the vibration wave application unit 51 is a sine wave in the present embodiment, but may be a pulse wave, a triangular wave, a sawtooth wave, or the like. The vibration wave applied to the operation command value $I_{ref}$ by the vibration wave application unit 51 has a higher frequency and lower amplitude than the operation command value I during the warm-up operation by the warm-up acceleration unit 38 described above. Therefore, the spool 28 of the control valve 25 vibrates due to the vibration wave, but the transmission ratio SR does not vary due to the vibration wave, and the piston 21b does not vibrate due to the vibration wave.

Thus, in the initial stage of the closed-loop control in the normal control, since the vibration wave is applied to the operation command value $I_{ref}$ for the control valve 25, microscopically, the vibration command value $I_{ref}$ is given to the control valve 25, and macroscopically, the command value $I_{ref}$ obtained by averaging each value between the maximum value and the minimum value of the vibration is given to the control valve. Therefore, as compared to the case where no vibration wave is applied to the command value $I_{ref}$ by the vibration wave application unit 51, the influence of the viscosity in the region where the opening degree of the control valve 25 is small is relieved, and the nonlinearity between the valve opening degree and the oil flow rate is relieved. Therefore, it is possible to suppress the instability of the closed-loop control after switching from the warm-up operation to the normal operation while shortening the warm-up operation. As a result, the control when the output rotation speed N2 approaches the command value $N2_{ref}$ is stabilized in the initial stage of the closed-loop control, and the power generation operation can be stably started early after the closed-loop control is started.

The frequency of the vibration wave generated by the vibration wave application unit 51 increases as the oil temperature detected by the oil temperature sensor 35 increases, and/or the amplitude decreases as the oil temperature increases. As a result, sufficient linearization can be achieved by the vibrational operation of the control valve at the initial stage of the closed-loop control, and the vibrational operation of the control valve is suppressed when the oil temperature rises after a lapse of time from the start of the closed-loop control, so that the stability of the control can be further improved. Note that the frequency and the amplitude of the vibration wave generated by the vibration wave application unit 51 in the initial stage of the closed-loop control may be constant regardless of the oil temperature detected by the oil temperature sensor 35.

When it is determined that the output rotation speed N2 has converged to the command value $N2_{ref}$ (t3), power generation by the generator 3 is started, and the frequency of the AC power generated by the generator 3 is maintained at the target frequency. In the present embodiment, the vibration wave application unit 51 applies a vibration wave to the operation command value $I_{ref}$ even in a stable stage after the start of the power generation operation of the generator 3. However, the vibration wave generated by the vibration wave application unit 51 in the stable stage after the start of power generation has a higher frequency and a lower amplitude than the vibration wave generated by the vibration wave application unit 51 in the initial stage before the start of the power generation. Therefore, the vibration of the spool 28 caused by the vibration wave is minute, the transmission ratio SR does not vary due to the vibration wave, and the piston 21b does not vibrate due to the vibration wave. As a result, sufficient linearization can be achieved by the vibrational operation of the control valve at the initial stage of the closed-loop control, and the vibrational operation of the control valve is suppressed in the stable stage after the start of the power generation operation, so that the stability of the control can be further improved.

The present invention is not limited to the above-described embodiment, and the configurations can be changed, added, or deleted. For example, the vibration wave application unit 51 may vibrate the operation command value $I_{ref}$ of the position control unit 43 by applying a vibration wave to a signal between the position subtraction unit 49 and the position control unit 43. The drive unit of the hydraulic actuator 20 is not limited to the hydraulic cylinder 21, and may be another form (for example, a hydraulic motor) as long as it generates a displacement force by hydraulic pressure. As the oil temperature acquisition unit, instead of the oil temperature sensor 35, a device that acquires information related to an oil temperature (for example, a temperature proportional to the oil temperature) (for example, a sensor that detects a piping temperature) may be used.

As the position acquisition unit, instead of the position estimation unit 42, a sensor that detects the roller positions may be used. That is, as long as the position acquisition unit acquires the actual values of the roller positions, the position acquisition unit may estimate the actual values of the rollers, or may receive a sensor value detected by a roller position sensor. The control target of the hydraulic actuator 20 may be a continuously variable transmission of another form instead of the toroidal continuously variable transmission, or may be a device that requires position control other than the transmission. The continuously variable transmission may drive another one without driving the generator.

REFERENCE SIGNS LIST

1 integrated drive generator (IDG)
3 generator
10 toroidal continuously variable transmission
16 power roller (transmission element)
20 hydraulic actuator
25 control valve
28 spool
35 oil temperature sensor (oil temperature acquisition unit)
40,140 transmission controller (position controller)
42 position estimation unit (position acquisition unit)
43 position control unit
51 vibration wave application unit
T oil temperature
$I_{ref}$ operation command value
$X_{ref}$ target value

The invention claimed is:

1. A position controller that performs position control by outputting a drive signal to a control valve of a hydraulic actuator that changes an operation position of an object, the position control comprising:
   a position acquisition unit that acquires an actual value of an operation position of the object;
   a position control unit that calculates an operation command value for the control valve by closed-loop control so as to reduce a deviation between a target value of the operation position of the object and the actual value; and
   a vibration wave application unit that applies a vibration wave to a signal of the closed-loop control so that the operation command value vibrates at a predetermined frequency at start of the closed-loop control,
   wherein the vibration wave application unit applies the vibration wave to the signal of the closed-loop control in a predetermined first period after the closed-loop control is started and a second period after the first period elapses, and
   wherein the vibration wave in the first period has at least one of a lower frequency or a higher amplitude than the vibration wave in the second period.

2. The position controller according to claim 1, wherein the object is a transmission element that changes a transmission ratio of a continuously variable transmission in accordance with a position change thereof.

3. The position controller according to claim 2, wherein the continuously variable transmission is a toroidal continuously variable transmission that changes the transmission ratio in accordance with a tilt angle of a power roller, and the transmission element is the power roller.

4. The position controller according to claim 2,
   wherein power output from the continuously variable transmission is input to a generator, and the generator starts a power generation operation with a delay from the start of the closed-loop control, and
   wherein the vibration wave application unit applies the vibration wave to the signal of the closed-loop control at least in a period after the closed-loop control is started and before the power generation operation of the generator is started.

5. The position controller according to claim 4,
   wherein the vibration wave application unit applies the vibration wave to the signal of the closed-loop control in an initial stage after the start of the closed-loop control and before start of the power generation operation of the generator and in a stable stage after the start of the power generation operation of the generator, and
   wherein the vibration wave in the initial stage has at least one of a lower frequency or a higher amplitude than the vibration wave in the stable stage.

6. A position controller that performs position control by outputting a drive signal to a control valve of a hydraulic actuator that changes an operation position of an object, the position control comprising:
   a position acquisition unit that acquires an actual value of an operation position of the object;
   a position control unit that calculates an operation command value for the control valve by closed-loop control so as to reduce a deviation between a target value of the operation position of the object and the actual value;
   a vibration wave application unit that applies a vibration wave to a signal of the closed-loop control so that the operation command value vibrates at a predetermined frequency at start of the closed-loop control; and
   an oil temperature acquisition unit that acquires information on an oil temperature of the hydraulic actuator,
   wherein, when it is determined that the oil temperature acquired by the oil temperature acquisition unit is lower than a reference temperature at the start of the closed-loop control, the vibration wave application unit applies the vibration wave to the signal of the closed-loop control.

7. The position controller according to claim 6, wherein the frequency is a frequency in a high frequency region in which a drive unit of the hydraulic actuator does not cause vibration due to the vibration wave.

8. The position controller according to claim 6, wherein the vibration wave application unit increases a frequency of the vibration wave as the oil temperature acquired by the oil temperature acquisition unit increases and/or decreases an amplitude of the vibration wave as the oil temperature increases.

9. A position controller that performs position control by outputting a drive signal to a control valve of a hydraulic actuator that changes an operation position of an object, the position control comprising:
- a position acquisition unit that acquires an actual value of an operation position of the object;
- a position control unit that calculates an operation command value for the control valve by closed-loop control so as to reduce a deviation between a target value of the operation position of the object and the actual value;
- a vibration wave application unit that applies a vibration wave to a signal of the closed-loop control so that the operation command value vibrates at a predetermined frequency at start of the closed-loop control; and
- a warm-up acceleration unit that outputs a drive signal to the control valve so as to reciprocate a spool of the control valve during a warm-up operation before the start of the closed-loop control,
wherein a frequency of the vibration wave of the vibration wave application unit is higher than a frequency of the drive signal of the warm-up acceleration unit.

\* \* \* \* \*